United States Patent [19]

Saeda et al.

[11] Patent Number: 5,204,507
[45] Date of Patent: Apr. 20, 1993

[54] WORK ROTATING DEVICE FOR LASER BEAM MACHINE TOOL

[75] Inventors: Koichi Saeda, Higashiosaka; Shunji Sakura, Kyoto; Hiroshi Kawanaka, Moriyama; Tatsuya Hirai, Itami; Hisakazu Sakamoto, Ashiya; Hisaharu Terashima, Toyonaki; Takashi Makino, Akashi; Masayuki Tamura, Kakogawa, all of Japan

[73] Assignee: Tsubakimoto Chain Co., Osaka, Japan

[21] Appl. No.: 746,034

[22] Filed: Aug. 14, 1991

[30] Foreign Application Priority Data

Aug. 14, 1990 [JP] Japan .................. 2-213645

[51] Int. Cl.⁵ ............................................ B23K 26/00
[52] U.S. Cl. ............................ 219/121.82; 269/71
[58] Field of Search .............. 219/121.82, 10.55 F, 219/69.2, 121.31, 121.58; 108/20, 139, 142; 51/237 R; 269/57, 61, 70, 71, 73; 228/49.1, 49.2

[56] References Cited

U.S. PATENT DOCUMENTS

| | | | |
|---|---|---|---|
| 2,257,195 | 9/1941 | Rovick | 51/237 R |
| 2,445,016 | 7/1948 | Bentley | 269/70 |
| 3,250,842 | 5/1966 | Hikido | 219/121.82 |
| 3,786,224 | 1/1974 | Heywang et al. | 269/57 |
| 4,441,432 | 4/1984 | Carlton | 108/139 |
| 4,502,457 | 3/1985 | Marron | 269/71 |
| 4,653,739 | 3/1987 | Moore | 228/49.2 |
| 5,069,269 | 12/1991 | Reuter et al. | 269/61 |
| 5,156,382 | 10/1992 | Saeda et al. | 269/71 |

FOREIGN PATENT DOCUMENTS 63-278683 11/1988 Japan .
1-158257 6/1989 Japan .
2-180552 7/1990 Japan .

Primary Examiner—Geoffrey S. Evans
Attorney, Agent, or Firm—Howson and Howson

[57] ABSTRACT

A work rotating device for a laser beam machine utilizes a work-supporting bed rotatable by a speed reducer mounted on a frame adapted to rest on a table of the laser beam machine. In a first embodiment, the speed reducer is fixed to the frame, and the frame has two orthogonal surfaces alternatively engageable with the table so that the axis of rotation of the work can be either vertical or horizontal. In a second embodiment, the speed reducer is manually tiltable in the frame by direct manual rotation of a shaft on which the speed reducer is mounted. In a third embodiment, the speed reducer through which the work is rotated is mounted on a shaft which is connected to a handwheel through another speed reducer. In a fourth embodiment, the speed reducer through which the work is rotated is tilted by a servo motor operating through a speed reducer.

23 Claims, 18 Drawing Sheets

WORK ROTATING DEVICE FOR LASER BEAM MACHINE TOOL

BRIEF SUMMARY OF THE INVENTION

This invention relates to work supporting devices for laser beam machine tools, and more particularly to improved work supporting devices incorporating rotatable work holders which make it possible to achieve accurate machining of surfaces of revolution with a laser beam.

Conventionally, most laser beam machine tools are designed with a laser head which moves relative to a fixed workpiece to machine the workpiece to the desired shape. Laser beam machine tools of this type have a number of disadvantages. One significant disadvantage is that the optical system allowing the laser head to move relative to the source of laser light is complicated and expensive, in that it requires multiple reflecting mirrors disposed in high-precision universal joints. Another significant disadvantage is that there is a large loss of energy in the path between the laser source and the laser head due to absorption and dispersion of laser light by the multiple mirrors required in the optical system.

There are, of course, many conventional machine tools having work holders which rotate relative to a fixed (or slowly adjusted) tool such as a cutting tool or a grinding tool. These rotating work holders require very solid supporting structures, e.g. twin-supporting structures, because they must have sufficient rigidity to endure the large external forces applied to the work during a machining operation. The rotating work holder itself is large in size and heavy (weighing generally about 100 kg. or more), and is hard to handle. Furthermore, conventional rotating work holders are designed for low-speed rotation, and are therefore not practical for use in laser beam machining operations.

The principal objects of this invention are to provide a work support for a laser beam machine tool which allows the laser system optics to be greatly simplified, and to provide a simple, light weight work support which is adapted for high-speed, accurate machining of a workpiece by means of a laser beam.

In accordance with a first embodiment of the invention, a work rotating device for a laser beam machine tool, comprises a frame having two orthogonal surfaces, each surface being adapted to be placed on the table of a laser beam machine tool so that the frame can be placed on the table alternatively with one or the other of the orthogonal surfaces of the frame in contact with the surface of the table. A speed reducer is supported on said frame, and has an input shaft and an output shaft. A motor is provided for rotating the input shaft of the speed reducer, and a work-supporting bed is rotated by the output shaft of the speed reducer.

In a second embodiment, the work rotating device comprises a frame having a surface adapted to be placed on the table of a laser beam machine tool, with a manually rotatable shaft rotatably supported on the frame. A speed reducer is connected to the manually rotatable shaft. A motor is provided for rotating the input shaft of the speed reducer, and a work-supporting bed is connected to the output shaft of the speed reducer. The manually rotatable shaft and the output shaft of the speed reducer are arranged with their axes in intersecting relationship to each other. In this second embodiment, there is preferably provided a lock mechanism for locking the manually rotatable shaft to the frame, and also an angle setting mechanism for setting the angle of inclination of the work-supporting bed.

In a third embodiment of the invention, the speed reducer is connected to a manually driven shaft through another speed reducer, and the axes of the output shaft of the manually-driven speed reducer and the output shaft of the motor-driven speed reducer are arranged in intersecting relationship to each other. In this third embodiment, there is also preferably provided a lock mechanism for locking the output shaft of the manually driven speed reducer to the frame.

In a fourth embodiment, the motor-driven speed reducer through which the work-supporting bed is driven is connected to the output shaft of another motor-driven speed reducer, with the axes of output shafts of the two speed reducers in intersecting relationship with each other.

In each of the four embodiments, the input shaft of the motor-driven speed reducer, through which the work-supporting bed is rotated, is preferably connected to the output shaft of its driving motor by a toothed belt and toothed pulleys meshing with the toothed belt, and the driving motor is mounted on a tension-adjusting plate mounted on the speed reducer. The tension-adjusting plate is provided with means for changing its position with respect to the speed reducer on which it is mounted, in order to adjust belt tension.

Other preferred features, applicable to each of the four embodiments, include an origin setting mechanism for setting an origin position for the work-supporting bed, a through hole in the frame, opposed to the origin setting mechanism, for providing access thereto.

In each of the four embodiments, the frame also preferably has a projection adapted to engage with a positioning groove formed on the table of a laser beam machine tool.

In each embodiment, the work-supporting bed is rotated by a motor through a speed reducer. In the first embodiment, the orientation of the work-supporting bed can be changed by 90° by placing one or the other of the two orthogonal surfaces on the table of the laser beam machine. In the second embodiment, the work-supporting bed can be tilted to an inclined condition by manual rotation of a shaft. In the third embodiment, the work-supporting bed can be tilted to an inclined condition by operating manually operable member connected to the input shaft of a speed reducer. In the fourth embodiment, the work-supporting bed can be tilted by operation of a motor. Thus, the direction of the axis of rotation of the work can be changed in any of several ways to produce the desired motion of the work.

Further objects, advantages and details of the invention will be apparent from the following detailed description, when read in conjunction with the drawings.

DETAILED DESCRIPTION

Figure 5:
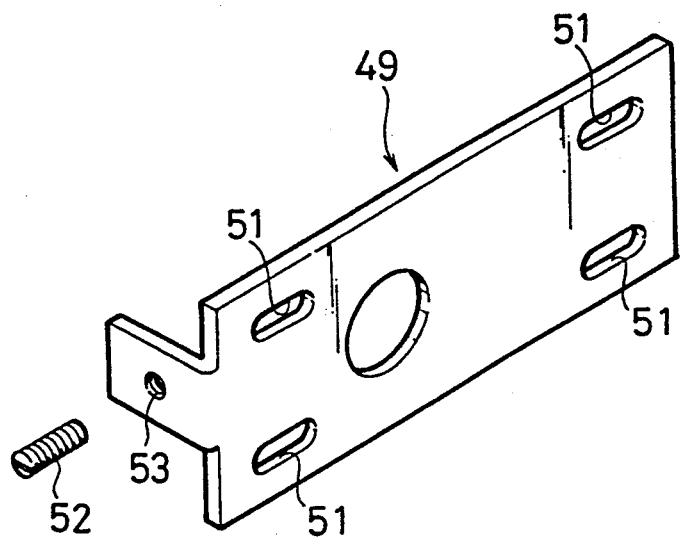
FIG. 5 is an exploded perspective view showing details of a tension adjusting plate and screw used in the device of FIG. 1.
Figure 6:
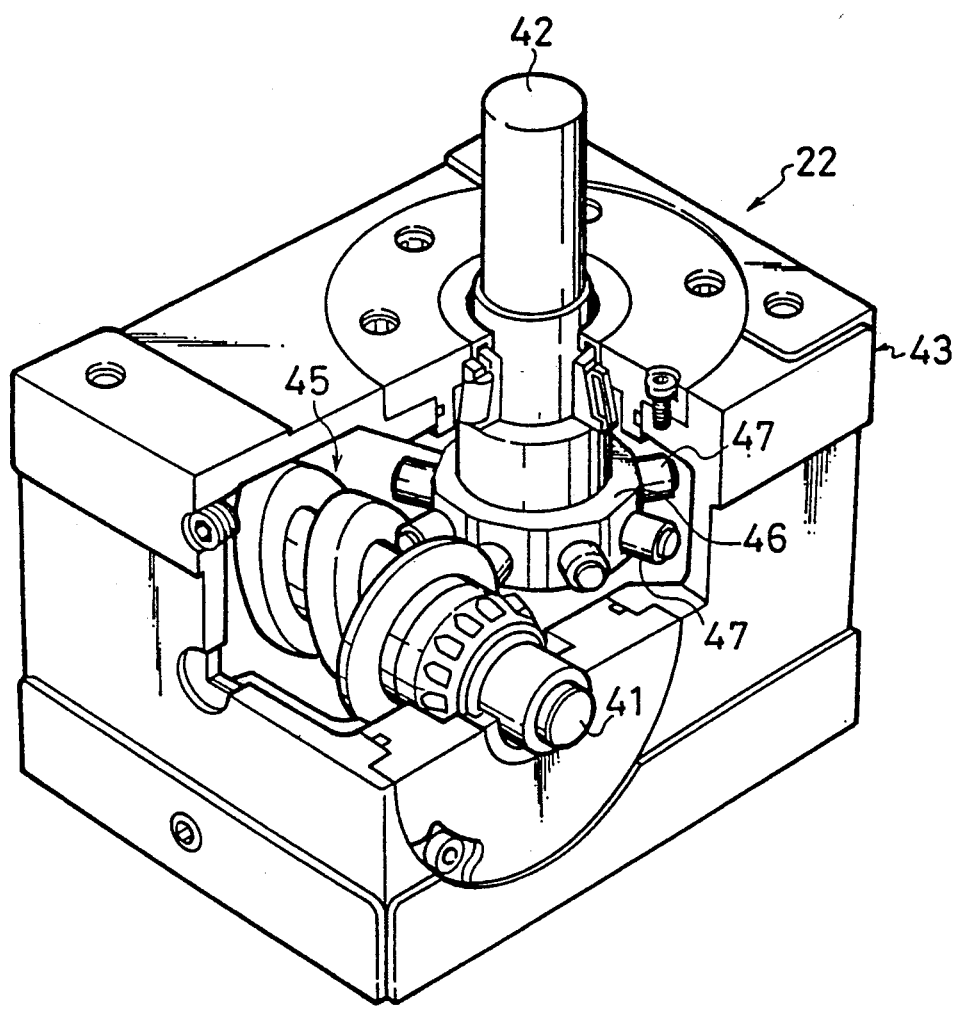
FIG. 6 is a partially cut-away perspective view of a speed reducer used in the device of FIG. 1.
Figure 7:
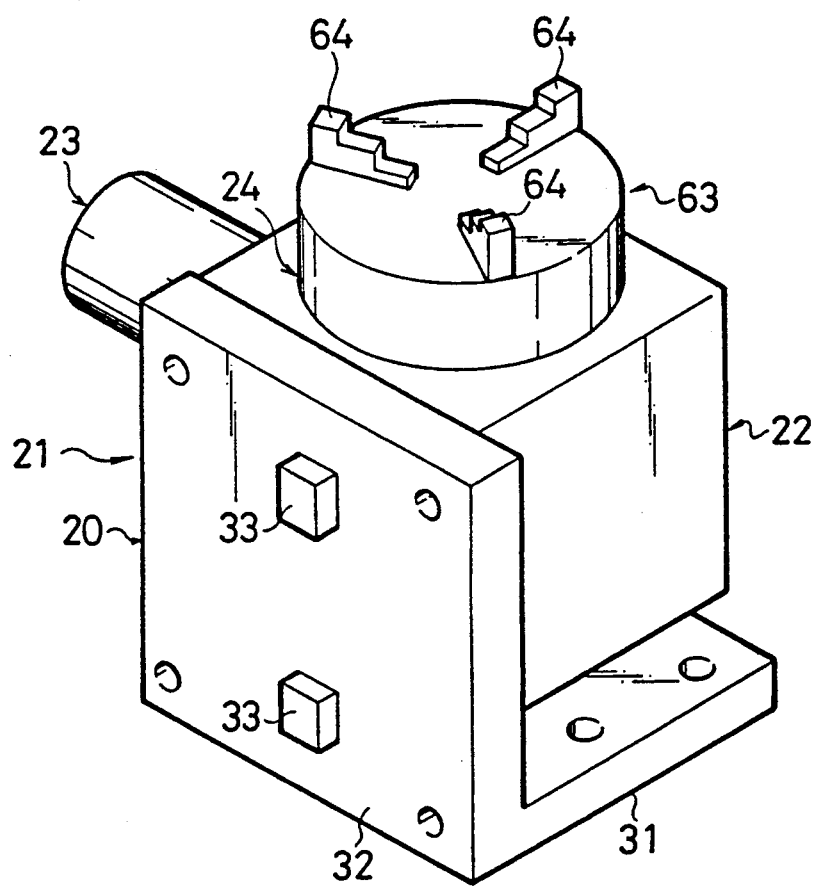
FIG. 7 is a schematic perspective view of the work rotating device of FIG. 1.

In the first embodiment of the present invention, shown in FIGS. 1 to 7, a work rotating device 20 is positionable on the table (not shown) a laser beam machine tool. As shown in FIG. 7, work rotating device 20 generally comprises a frame 21, a speed reducer 22, a servo motor 23, and a work-supporting bed 24. The device also includes an origin setting mechanism 25 shown in FIGS. 1 and 4.

Figure 3:
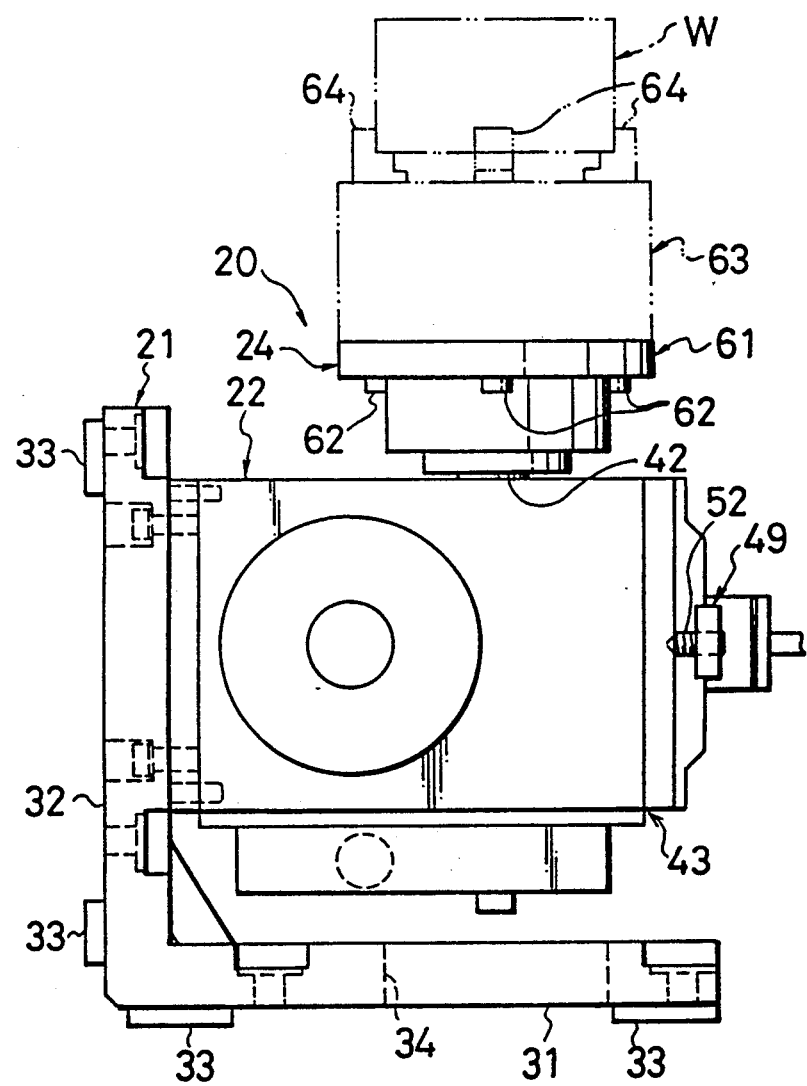
FIG. 3 is a left side elevational view of the device of FIG. 1.

As shown in FIGS. 3 and 7, the frame 21 is generally L-shaped, having two orthogonal surfaces 31 and 32 adapted to be selectively placed on the table of a laser beam machine tool. Each of surfaces 31 and 32 is provided with two projections 33 adapted to engage with a positioning groove (not shown) formed on the table. A portion of frame 21 opposed to origin setting mechanism 25 is provided with a through hole 34, (FIGS. 1 and 3), to permit easy removal of a cover 70 (FIG. 1) for adjustment of origin setting mechanism 25. Through hole 34, by providing access to the origin setting mechanism, allows speed reducer 22 and work-supporting bed 24 to be mounted on frame 21 in such a way that they are close to the table of the laser beam machine when frame 21 is mounted thereon.

As shown in FIG. 6, an input shaft 41 and an output shaft 42 of speed reducer 22 are rotatably supported by, and extend in orthogonal directions from, an aluminum housing 43. A worm 45 is machined in input shaft 41, and a cam follower 46 is formed as an integral part of output shaft 42. A plurality of needle rollers 47 project radially from follower 46, and worm 45 meshes with needle rollers 47. To eliminate backlash in speed reducer 22, input shaft 41 is positioned with respect to output shaft 42 so that the axes of the two shafts are closer to each other than they would be for normal meshing. In this way, needle rollers 47 preload worm 45. Accordingly, output shaft 42 can rotate at a lower speed than that of input shaft 41, but without backlash.

A side plate 48 (FIG. 1) is fixed on the housing 43 of speed reducer 22, and a tension adjusting plate 49 (FIG. 5), for adjusting the tension of a toothed belt to be described later, is movably mounted on side plate 48. Motor 23 is fixedly mounted on tension adjusting plate 49. Tension adjusting plate 49 is L-shaped, having a main body and a tab, as shown in FIG. 5, and is formed with four elongated through holes 51 for receiving four mounting bolts, one of which is designated by numeral 50 in FIG. 2. One tapped hole 53 is formed in the tab of plate 49 for receiving an adjusting screw 52.

An output shaft 26 of motor 23 is connected to input shaft 41 of speed reducer 22 through a toothed belt 54 and toothed pulleys 55 and 56, mounted on output shaft 26 and input shaft 41, respectively. Belt 54 and the pulleys 55 and 56 are enclosed by side plate 48. Although not shown, the teeth of belt 54 and the teeth of toothed pulleys 55 and 56 have tooth profiles establishing a tight mesh between the teeth of the belt and the teeth of the pulleys so that backlash is almost completely eliminated.

Figure 2:
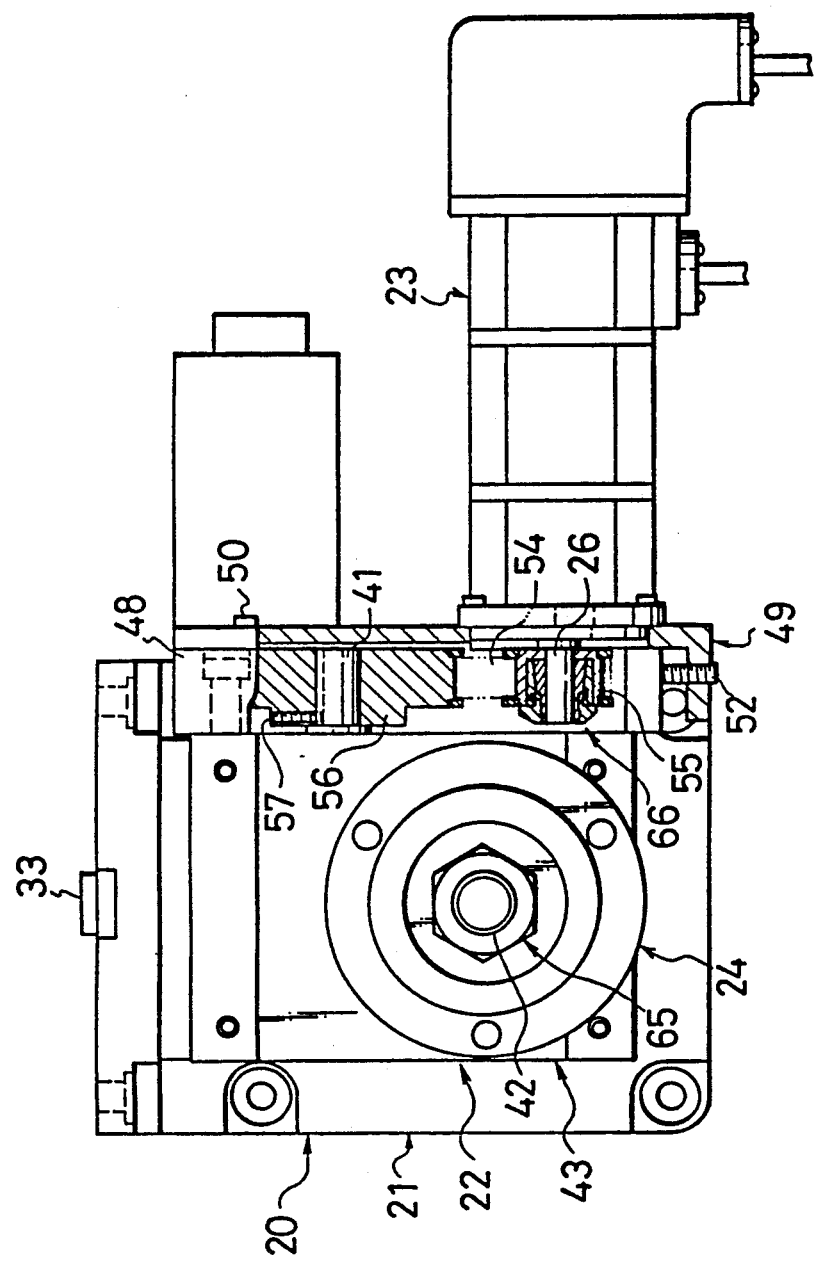
FIG. 2 is a top plan view, partly in section, of the device of FIG. 1.

Referring to FIG. 2, the tension of toothed belt 54 is adjusted as follows. First, mounting bolts 50 are loosened to allow movement of tension adjusting plate 49. Second, adjusting screw 52 is rotated by a screwdriver and thereby advanced in tapped hole 53 (FIG. 5) of tension adjusting plate 49 so that the forward end of screw 52 abuts a side surface of end plate 48. This causes tension adjusting plate 49 to slide relative to end plate 48, while being guided by the engagement of elongated holes 51 with the loosened mounting bolts 50. As a result, output shaft 26 of motor 23, which is fixed to tension adjusting plate 49, is moved away from input shaft 41 of speed reducer 22. This increases the distance between the axes of output shaft 26 and input shaft 41, thereby increasing tension in belt 54. Finally, when the tension in belt 54 reaches the desired level, rotation of adjusting screw 52 is stopped, and mounting bolts 50 are retightened to fix tension adjusting plate 49 to side plate 48.

Figure 1:
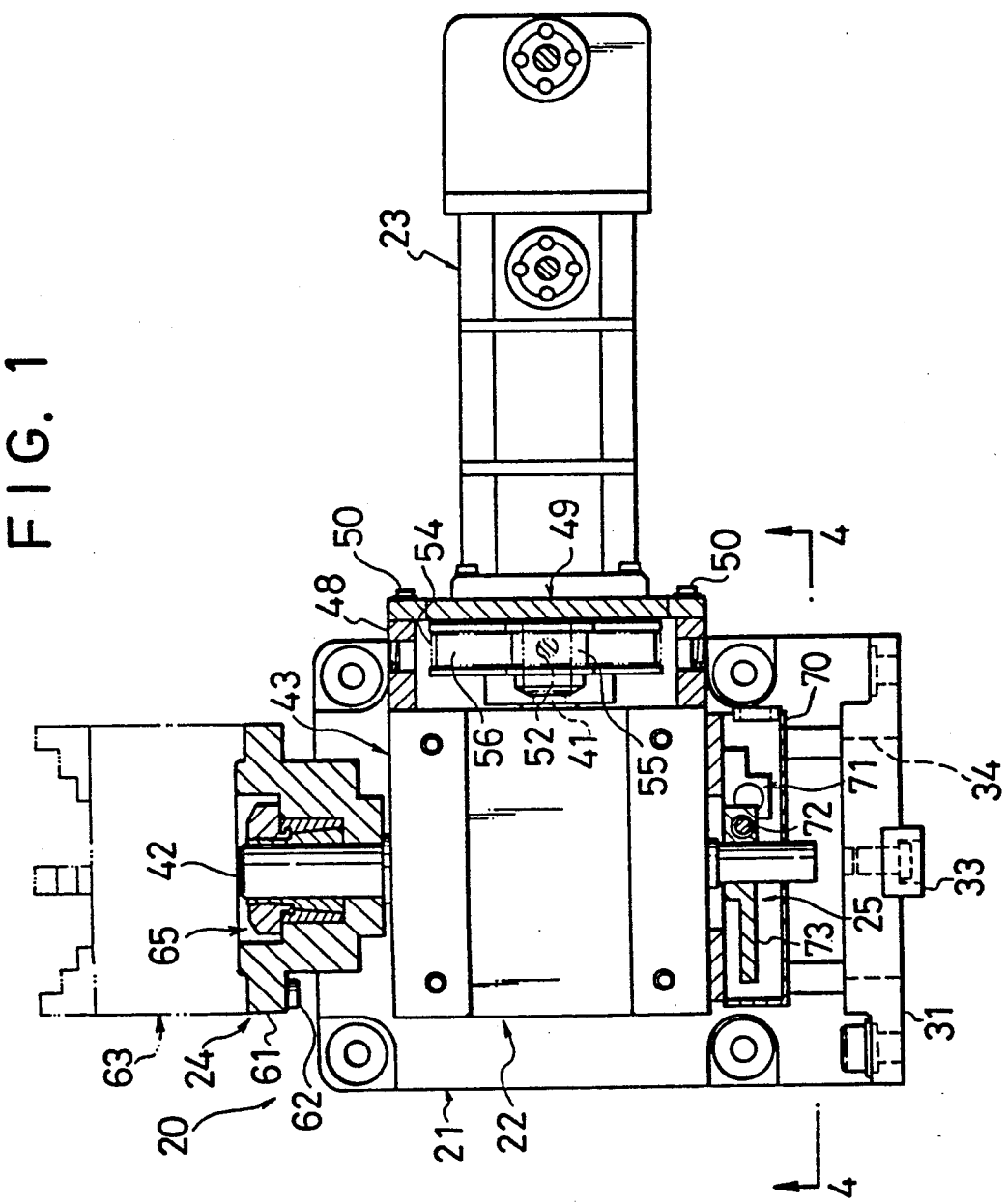
FIG. 1 is an elevational view, partly in section, showing a work rotating device in accordance with a first embodiment of the invention.

As shown in FIG. 1, work-supporting bed 24 comprises a chuck supporting member 61 fixedly mounted on output shaft 42 of speed reducer 22 and a conventional chuck 63 fixedly mounted on chuck supporting member 61 by bolts 62. Chuck 63 has three stepped jaws 64 capable of grasping a workpiece W (see FIG. 3).

As shown in FIG. 1, chuck supporting member 61 is integrally connected with output shaft 42 of speed reducer 22 by means of a collet mechanism 65, which utilizes frictional forces and does not require a key or key slot. Similarly, as shown in FIG. 2, toothed pulley 55 is integrally connected with output shaft 26 of motor 23 by means of a collet mechanism 66. Toothed pulley 56 is fixed to input shaft 41 of speed reducer 22 by a set screw 57.

Figure 4:
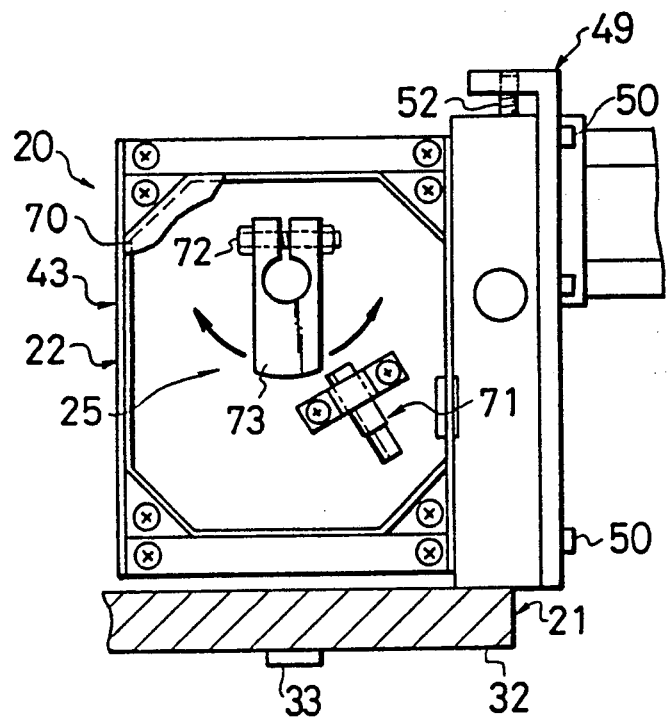
FIG. 4 is a partially cut-away horizontal section taken on plane 4—4 of FIG. 1.

Referring to FIG. 4, an origin setting mechanism 25, for setting an origin position for rotation of the work-supporting bed 24 and also for detecting excess rotation of the work-supporting bed, comprises a proximity switch 71 and a switch operating member 73. Proximity switch 71 is fixedly mounted on a lower surface of housing 43 of speed reducer 22. As shown in FIG. 1, output shaft 42 of speed reducer 22 extends vertically through housing 43 and projects upwardly and downwardly from upper and lower surfaces of housing 43 respectively. Switch operating member 73 is adjustably mounted on a portion of the lower end of output shaft 42 projecting downwardly from housing 43 by means of an adjusting bolt 72. Switch operating member 73 is disposed in opposed relationship to proximity switch 71. With this construction, by changing or adjusting the position of switch operating member 73 on output shaft 42, the origin position, and the position at which excess rotation of the work supporting bed is detected, can be changed or adjusted according the requirements of the particular work machining operation being undertaken.

The operation of work rotating device 20 is as follows. With a workpiece W held by the jaws of chuck 63 on work-supporting bed 24, motor 23 is operated. The torque of motor 23 is transmitted through motor output shaft 26, pulley 55, toothed belt 54, pulley 56, input shaft 41 of speed reducer 22, worm 45, and follower 46, to output shaft 42. As a result, work-supporting bed 24 is rotated about an axis of the output shaft 42. Thus, bed 24 is rotated in a horizontal plane when the axis of shaft 42 is vertical. In this operation, because of the speed reduction effected by speed reducer 22, work-supporting bed 24 is rotated at a speed much lower than the speed of motor 23. Thus, workpiece W is rotated about a vertical axis by the work rotating device 20, when device 20 is situated with surface 31 of its frame 21 on the horizontal surface of the table of a laser beam machine.

When the frame is rotated 90° so that the other surface 32 of the frame is in contact with the horizontal surface of the table, workpiece W can be rotated about a horizontal axis. Thus, the frame has two alternative positions, one in which the axis of rotation of the workpiece is vertical, and the other in which the axis of rotation of the workpiece is horizontal.

FIGS. 8–11 illustrate a second work rotating device 120, in which the axis of rotation of a workpiece can be varied from a vertical position to any inclination within a range of 90° or more on both sides of the vertical.

In device 120, a work-supporting bed 124 can be manually tilted by a lever 175. The parts which are the same as those in work rotating device 20 of FIGS. 1 to 7, are designated by reference numerals which exceed the numerals used in FIGS. 1–7 by one-hundred, and the explanation thereof will be omitted.

As in the case of the first embodiment, work rotating device 120 is placed on a table (not shown) of a laser beam machine. Work rotating device 120 generally comprises a frame 176, a manually rotatable shaft 178, rotatably supported in frame 176, a speed reducer 122 fixed to shaft 178, servo motor 123 for rotating an input shaft 141 of speed reducer 122, work-supporting bed 124 fixedly mounted on an output shaft 142 of speed reducer 122, and origin setting mechanism 125, provided on the portion of output shaft 142 extending below the speed reducer, and on speed reducer housing 143.

Figure 8:
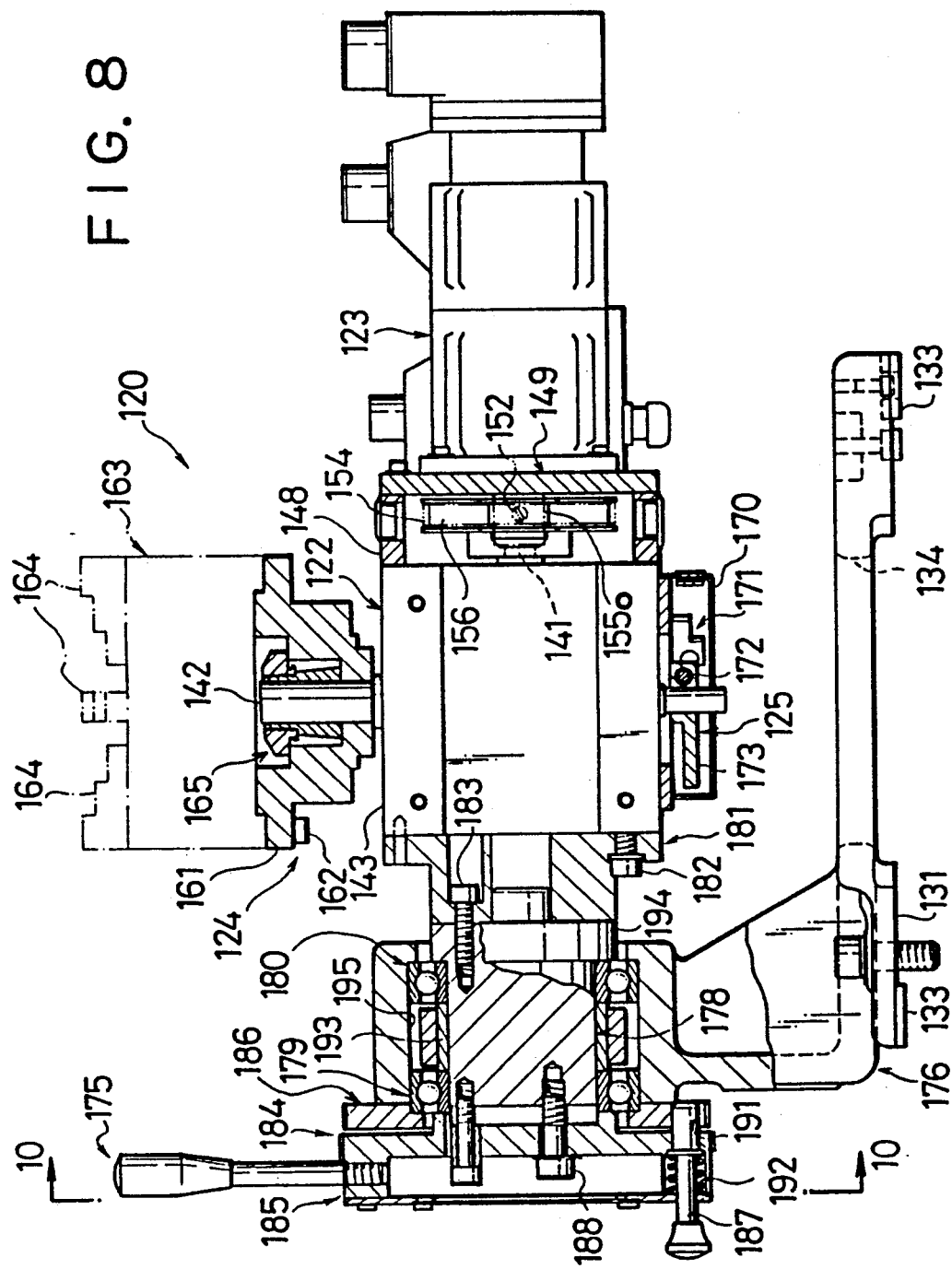
FIG. 8 is an elevational view, partly in section, showing a work rotating device in accordance with a second embodiment of the invention.

As shown in FIG. 8, frame 176 has a single surface 131 adapted to be placed on the horizontal surface of the table of a laser beam machine. Frame 176 has an L-shaped configuration with an upstanding portion having a hole 195, in which a pair of bearings 179 and 180 are mounted for rotatably supporting manually rotatable shaft 178. Shaft 178 and speed reducer 122 are connected together by means of a bracket 181, which is bolted to shaft 178 by a plurality of bolts, one of which is shown at 183, and to the speed reducer housing 143 by a plurality of bolts, one of which is shown at 182. Thus, manually rotatable shaft 178 and output shaft 142 of speed reducer 122 are arranged in orthogonal relationship to each other.

As shown in FIG. 8, there is provided, between a left side surface of the upstanding portion of frame 176 and a left end of manually rotatable shaft 178, an inclination setting mechanism 184 for setting the angle of inclination of work-supporting bed 124.

Figure 9:
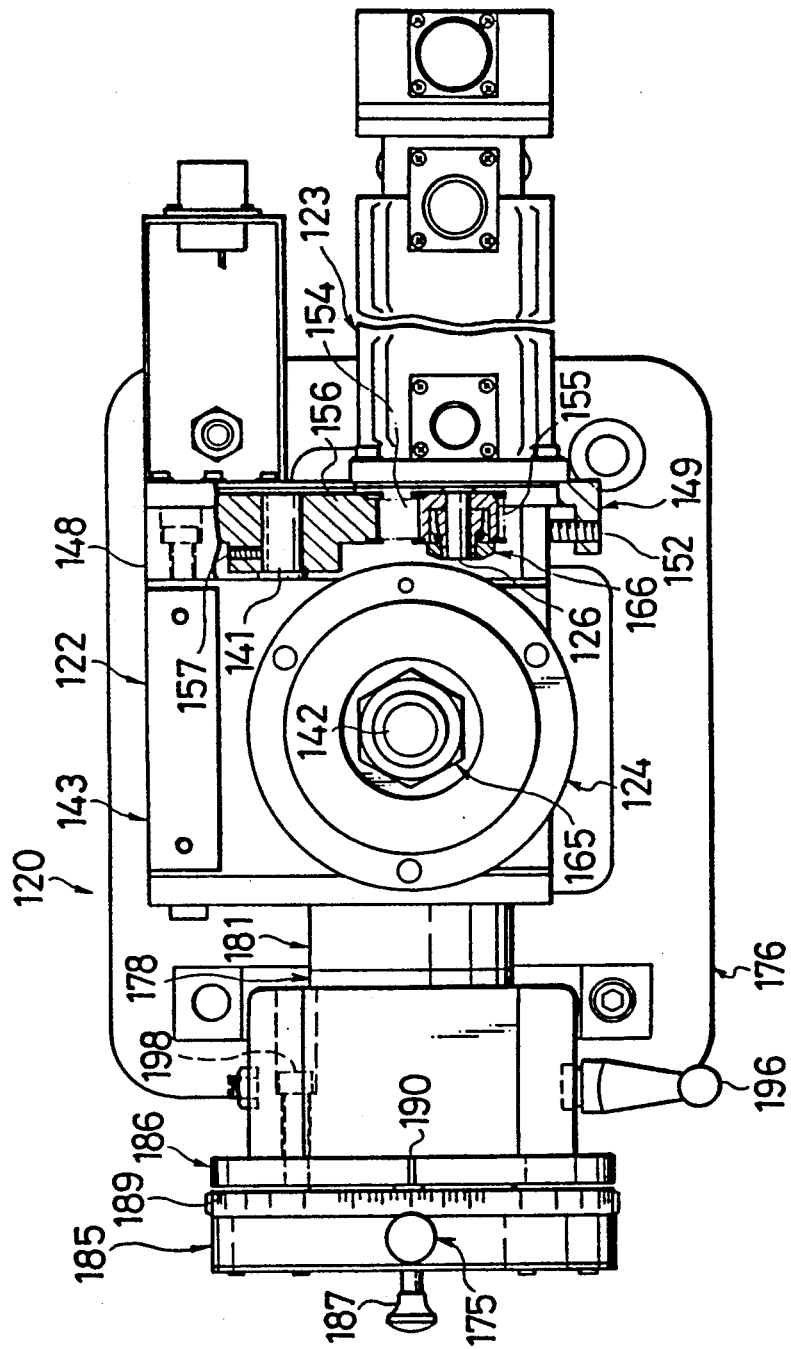
FIG. 9 is a top plan view, partly in section, of the device of FIG. 8.

Inclination setting mechanism 184 generally comprises a scale disc 185, an angle indexing disc 186, and an angle indexing pin 187. As shown in FIG. 8, scale disc 185 is fixed to the left end of manually rotatable shaft 178 by bolts 188. The scale disc 185 is provided with a swing lever 175 extending radially outward, and an angle scale 189 (see FIG. 9) is provided on the outer circumference of scale disc 185. Angle indexing disc 186 is fixed to the left side surface of the upstanding portion of frame 176 by bolts 198 (see FIG. 9). As shown in FIG. 9, angle indexing disc 186 is provided on its outer circumference with a recess 190 which is readable against angle scale 189 to indicate the angle of inclination of work-supporting bed 124. The angle indexing disc 186 is formed with a plurality of axial holes one being shown at 191 in FIG. 8. These holes are adapted to be engaged selectively by pin 187. In this embodiment, holes 191 are arranged at 90° intervals. Angle indexing pin 187 is supported on scale disc 185 and is normally biased toward angle indexing disc 186 by a spring 192.

An inner ring and an outer ring of bearing 179 are urged by scale disc 185 and angle indexing disc 186 respectively, in the direction of the axis of manually rotatable shaft 178. An intermediate ring 193 is mounted on shaft 178 and interposed between the bearings 179 and 180. Accordingly, the inner and an outer rings of bearing 180 are urged by bearing 179, through intermediate ring 193, axially against a flange 194 of shaft 178 and an inside end surface formed in hole 195 of frame 176. With this construction, play in bearings 179 and 180 in the thrust direction is eliminated.

Frame 176 is provided with a conventional swingable lock lever 196 (FIGS. 9–11) for locking manually rotatable shaft 178 to frame 176.

Figure 10:
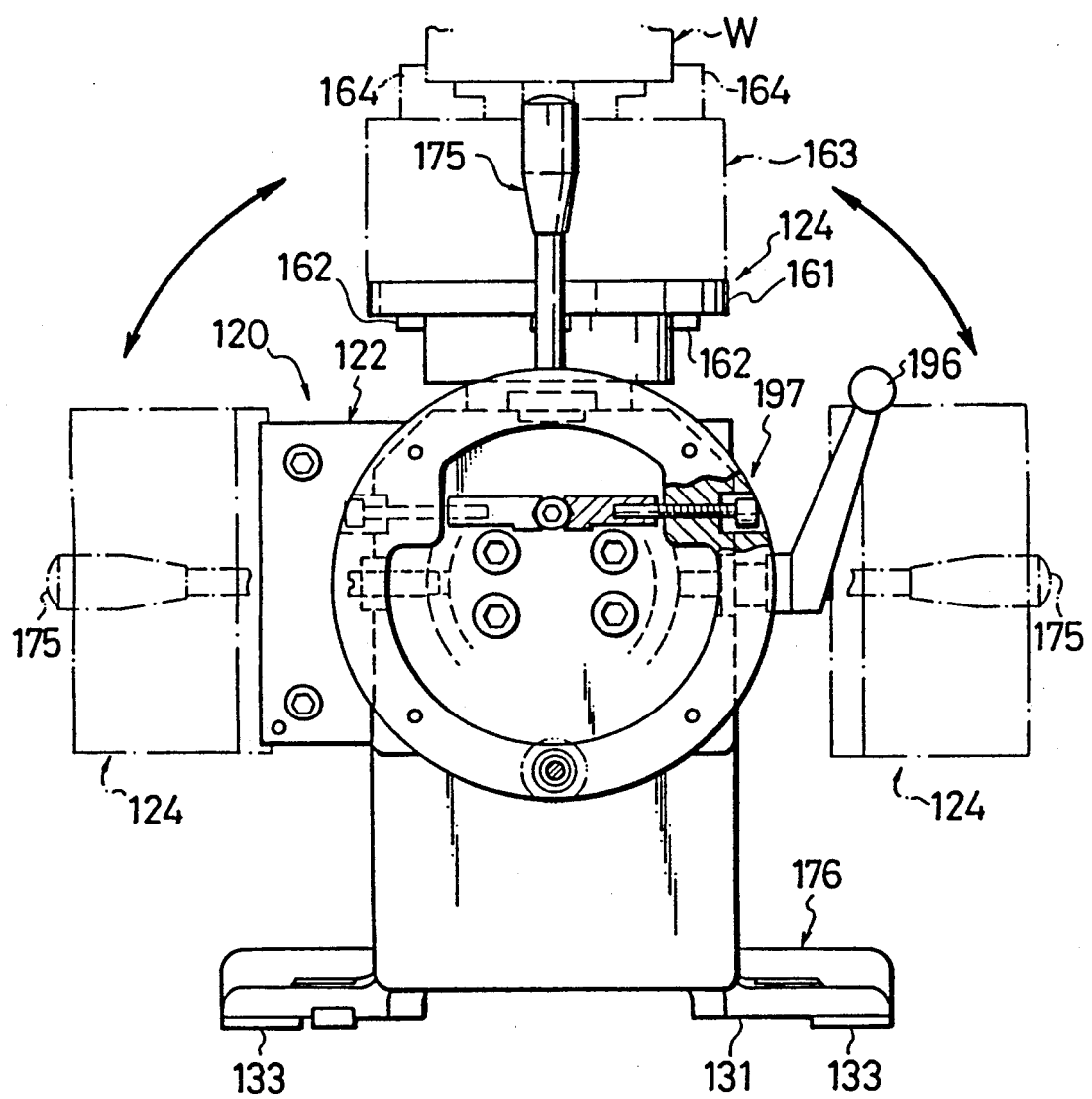
FIG. 10 is a partially cut-away vertical section taken on plane 10—10 of FIG. 8.

Referring to FIG. 10, a zero angle adjusting mechanism 197 is provided between scale disc 185 and shaft 178. The zero angle adjusting mechanism 197 serves to adjust the rotational position of scale disc 185 in order to bring a zero mark (i.e., an origin mark) of the angle scale 189 into register with recess 190 when work-supporting bed 124 is horizontal.

Adjustment of the origin position of scale disc 185 is carried out by first loosening bolts 188 while work-supporting bed 124 is horizontal. This allows scale disc 185 to be rotated relative to shaft 178. Then, scale disc 185 is rotated slightly to bring its zero mark into register with recess 190. After the zero mark is brought into register with recess 190, bolts 188 are retightened to fix scale disc 185 to shaft 178.

Figure 11:
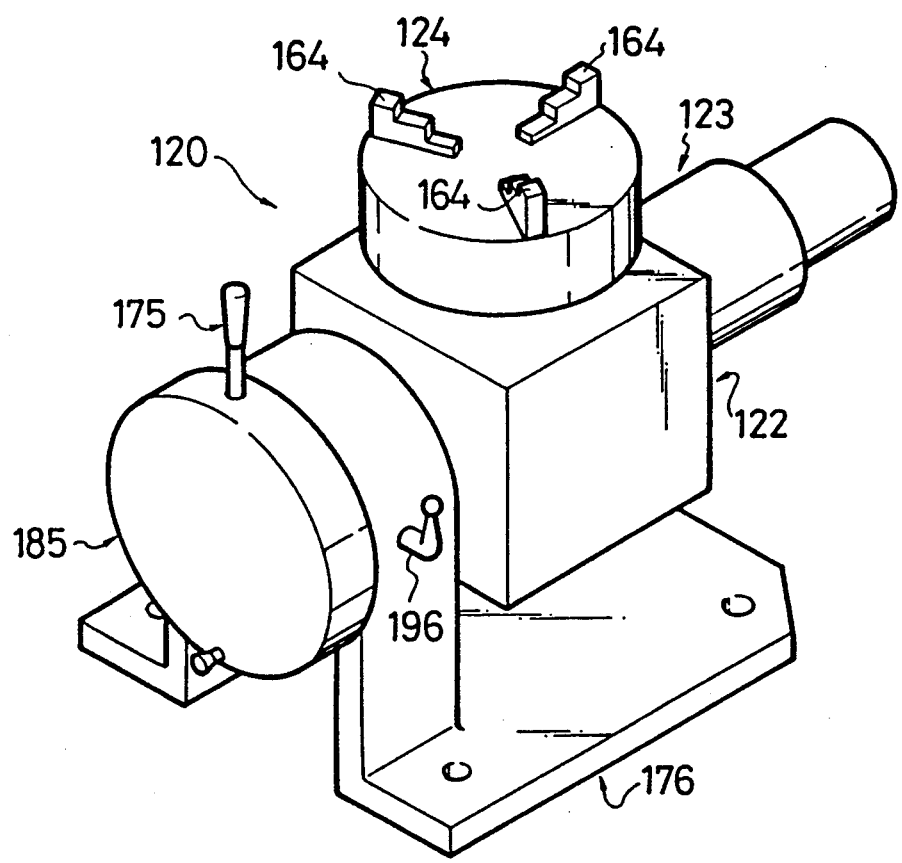
FIG. 11 is a schematic perspective view of the device of FIG. 8.

In operation of the work rotating device 120, with the work supporting chuck arranged to rotate the work about a vertical axis as shown in FIG. 11, servo motor 123 is operated in the appropriate direction. The speed of rotation of work-supporting bed 124 is lower than that of the servo motor 123 because of the speed reduction effected by speed reducer 122.

Lock lever 196 can be swung to unlock manually rotatable shaft 178 so that it can rotate relative to frame 176. Then, pin 187 is drawn out of hole 191 against biasing force of spring 192, and lever 175 is manually swung to rotate shaft 178. As a result, speed reducer 122 and work-supporting bed 124 are swung together by the rotation of shaft 178. The angle of inclination of work-supporting bed 124 can be read from scale 189. When work-supporting bed 124 is tilted to the desired angle of inclination, lock lever 196 is swung to lock shaft 178 to frame 176. Thus, work-supporting bed 124 is fixed in an inclined condition at the desired angle relative to frame 176, which is normally within an angular range of 90° on either side of the position shown in FIG. 11. Workpiece W is rotated while in an inclined condition at the desired angle, and machined by the laser beam during rotation.

By selectively inserting indexing pin 187 into one of holes 191, workpiece W can be easily tilted to a predetermined angle, e.g., every 90°.

FIGS. 12–15 illustrate a third work rotating device 220 having a tiltable axis of rotation. In device 220, a work-supporting bed 224 can be manually tilted to any desired angle within a range by a manually operable handwheel 310. The parts which are the same as those in work rotating device 120 of FIGS. 8–11 are designated by reference which exceed the numerals used in FIGS. 9–11 by one-hundred, and the explanation thereof will be omitted.

A speed reducer 222 and a rotating shaft 278, employed in the embodiment shown in FIGS. 12–15, are identical in construction respectively with speed reducer 122 and manually rotatable shaft 178 employed in the embodiment shown in FIGS. 8–11.

As in the case of the embodiment of FIGS. 8–11, work rotating device 220 is placed on the horizontal surface of the table (not shown) of a laser beam machine. Work rotating device 220 generally comprises a frame 276, first speed reducer 322, manually operable handwheel 310, second speed reducer 222, servo motor 223, work-supporting bed 224, and origin setting mechanism 225.

Figure 12:
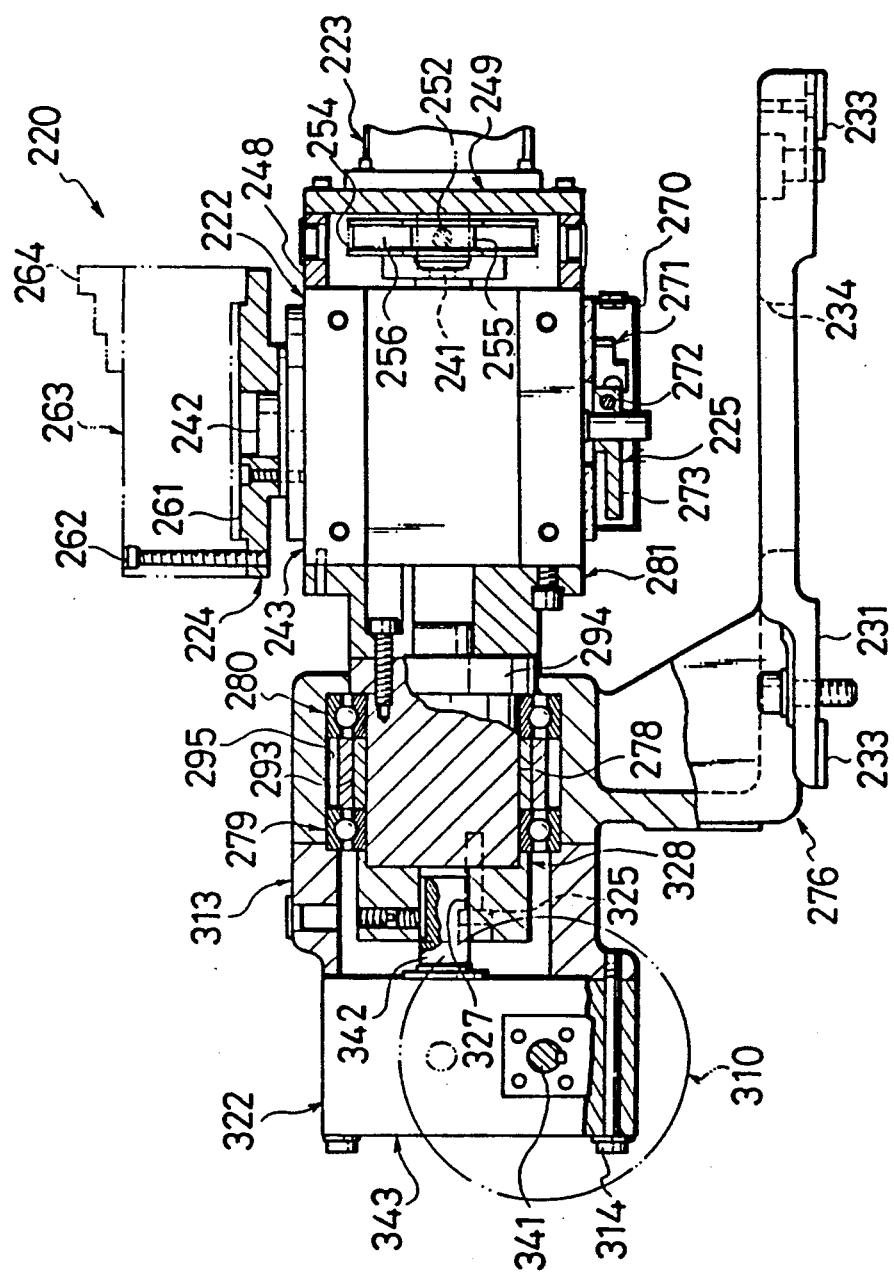
FIG. 12 is an elevational view, partly in section, showing a work rotating device in accordance with a third embodiment of the invention.

A bracket 313 is fixed by bolts 312 (FIG. 13) to the left side surface of the upstanding portion of the frame 276 as viewed in FIG. 12. The first speed reducer 322 is fixed by bolts 314 to a left side surface of bracket 313 as viewed in FIG. 12. Speed reducer 322 includes a housing 343 made of cast iron, and input and output shaft 341 and 342, both rotatably supported in housing 343. Input shaft 341 and output shaft 343 are arranged in orthogonal relationship to each other. Handwheel 310 is keyed on input shaft 341. A connecting member 328 is fixed by bolts 325 to the left end of rotatable shaft 278. Output shaft 342 of speed reducer 322 extends into a central hole 327 of connecting member 328. Connecting member 328 is keyed to shaft 342, and the key is held in place by a set screw. Accordingly, output shaft 342 of first speed reducer 322 extends in orthogonal relationship to output shaft 242 of second speed reducer 222.

As in the case of indexing disc 186 and scale disc 185 in work rotating device 120 (FIGS. 8–11), bracket 313 and connecting member 328 urge the outer and inner rings of bearings 279 and 280 axially so as to eliminate play of the bearings in the thrust direction.

Figure 13:
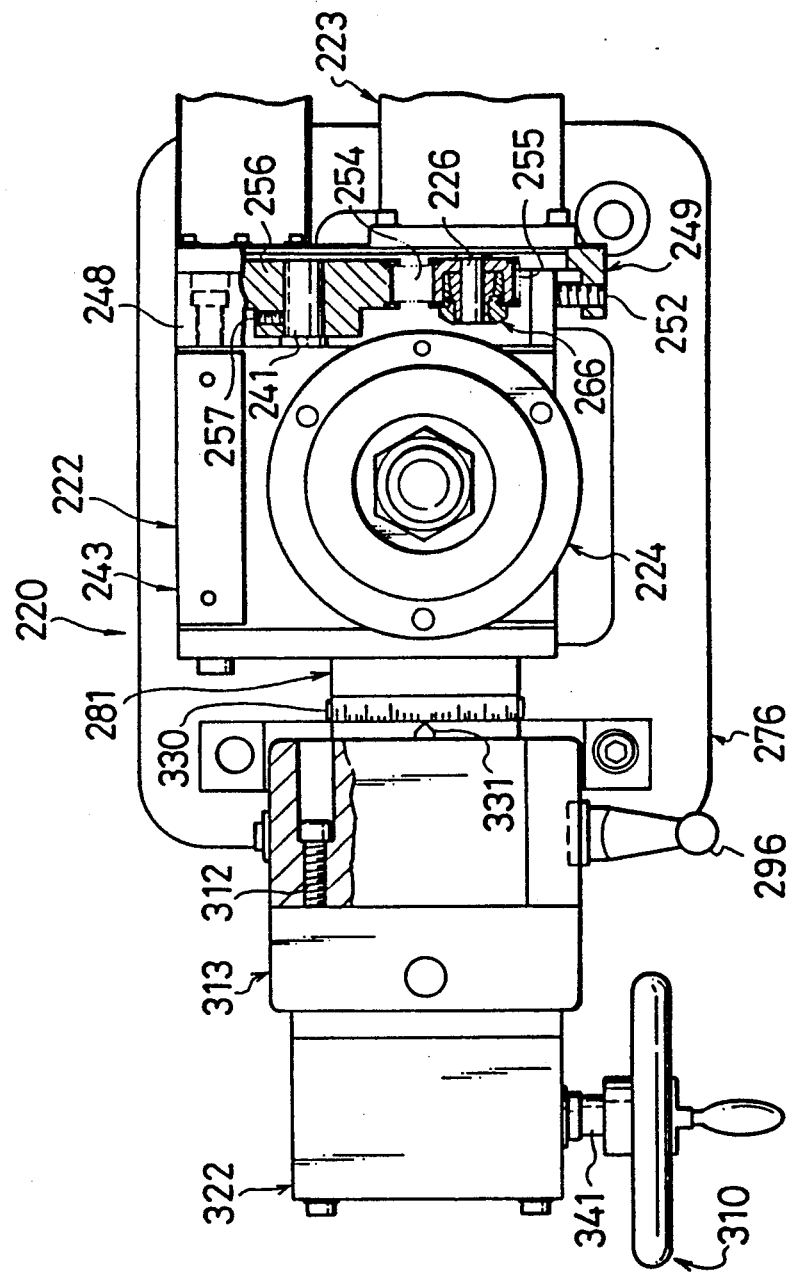
FIG. 13 is a top plan view, partly in section, of the device of FIG. 12.

Speed reducer 222 is connected through a bracket 281 to rotatable shaft 278. As shown in FIG. 13, an angle scale 330 is provided on the outer periphery of bracket 281. A pointer 331 is provided on frame 276 adjacent to the angle scale so that the angle of inclination of the work-supporting bed can be read.

Figure 14:
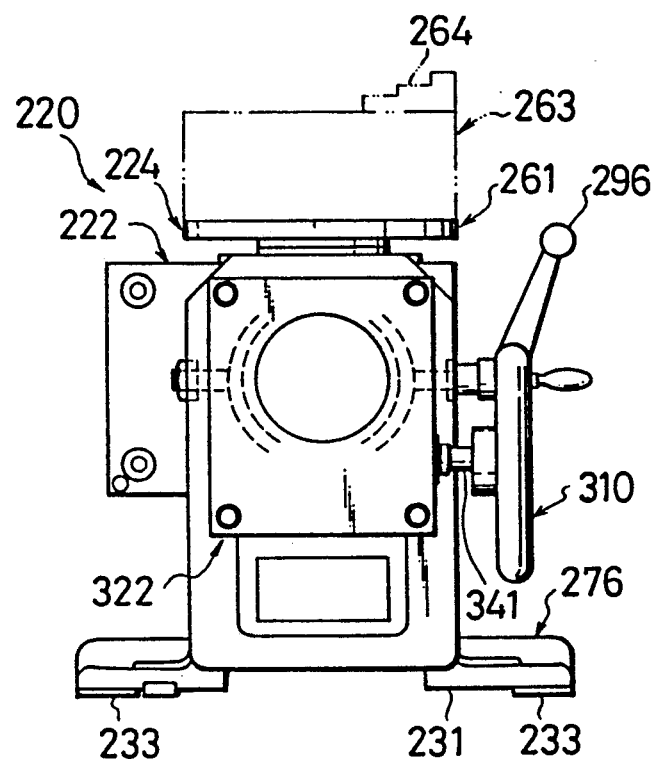
FIG. 14 is a left side elevational view of the device of FIG. 12.
Figure 15:
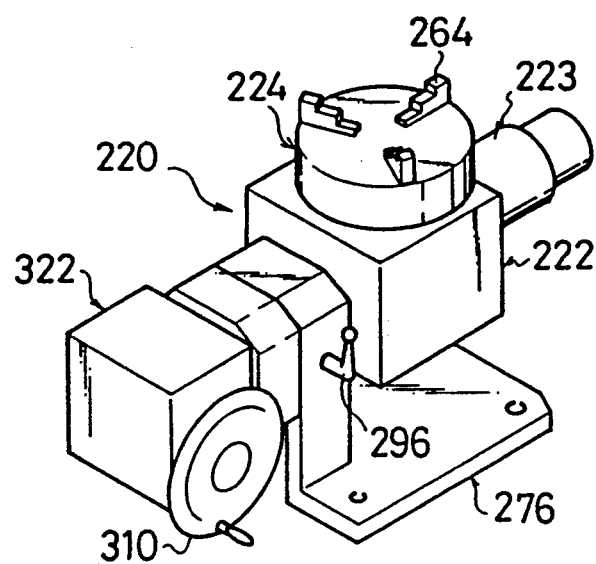
FIG. 15 is a schematic perspective view of the device of FIG. 12.

In FIG. 14, the axis of the work-supporting bed is vertical so that work-supporting bed 224 is rotated in a horizontal plane by operation of motor 223. The rotational speed of work-supporting bed 224 is lower than that of motor 223 by virtue of the reduction effected by speed reducer 222.

To tilt the work, a locking lever 296 is swung to unlock rotating shaft 278 to allow the shaft to be rotated. Then, handwheel 310 is manually turned to cause rotation of shaft 278 by output shaft 342 of first speed reducer 322. As a result, second speed reducer 222 and work-supporting bed 224 are tilted together by the rotation of shaft 278. At this time, the rate at which work-supporting bed 224 is tilted is lower than the rate of rotation of handwheel 310 by virtue of the reduction effected by speed reducer 322. The inclination of work-supporting bed 224 can be read from angle scale 330. When the work-supporting bed 224 is tilted to the desired angle of inclination, locking lever 296 is swung to its locking position to secure shaft 278 against rotation relative to frame 276. Thus, work-supporting bed 224 is fixed at the desired angle relative to frame 276. The workpiece W is then rotated and machined by the laser beam while in an inclined condition.

Speed reducer 322 is preferably designed with a preload between its worm and follower so that backlash is substantially eliminated as in the case of speed reducer 222. This reduces the magnitude of errors in the adjustment of the inclination of work-supporting bed 224 by operation of handwheel 310, which can occur especially when the direction of rotation of the handwheel is reversed.

FIGS. 16–21 illustrate still another work rotating device 420 having plural axes of rotation according to a fourth embodiment of the invention.

As in the case of the previously described embodiments, work rotating device 420 is designed to be supported on the horizontal surface of the table (not shown) a laser beam machine. Work rotating device 420 generally comprises a frame 676, a first speed reducer 422, a first servo motor 423, a second speed reducer 522, a second servo motor 523, a work-supporting bed 524, a first origin setting mechanism 625, and a second origin setting mechanism 525.

In work rotating device 420, the work-supporting bed 524 can be tilted by servo motor 423. Work rotating device 420 has a structure such that two assemblies, each consisting of a speed reducer, a motor and associated parts, are employed.

The first and second speed reducers 422 and 522 in work rotating device 420 are substantially identical in structure with the speed reducer 22 in work rotating device 20 of FIGS. 1–7. The first and second motors 423 and 523 in work rotating device 420 are likewise substantially identical in structure to motor 23 in work rotating device 20 of FIGS. 1–7. The second origin setting mechanism 525 in work rotating device 420 is substantially identical in structure with origin setting mechanism 25 in work rotating device 20. Work-supporting bed 524 in work rotating device 420 is substantially identical in structure with work-supporting bed 24 in FIGS. 1-7. The other parts associated with motor 423 and speed reducer 422 are designated by reference numerals which exceed the numerals used for corresponding parts in FIGS. 1-7 by four hundred, and the other parts associated with second motor 523, second speed reducer 522, second origin setting mechanism 525 and work-supporting bed 524 are designated by reference numerals which exceed the numerals used for corresponding parts in FIGS. 1-7 by five hundred. Accordingly, detailed explanation of these parts will be omitted.

Figure 16:
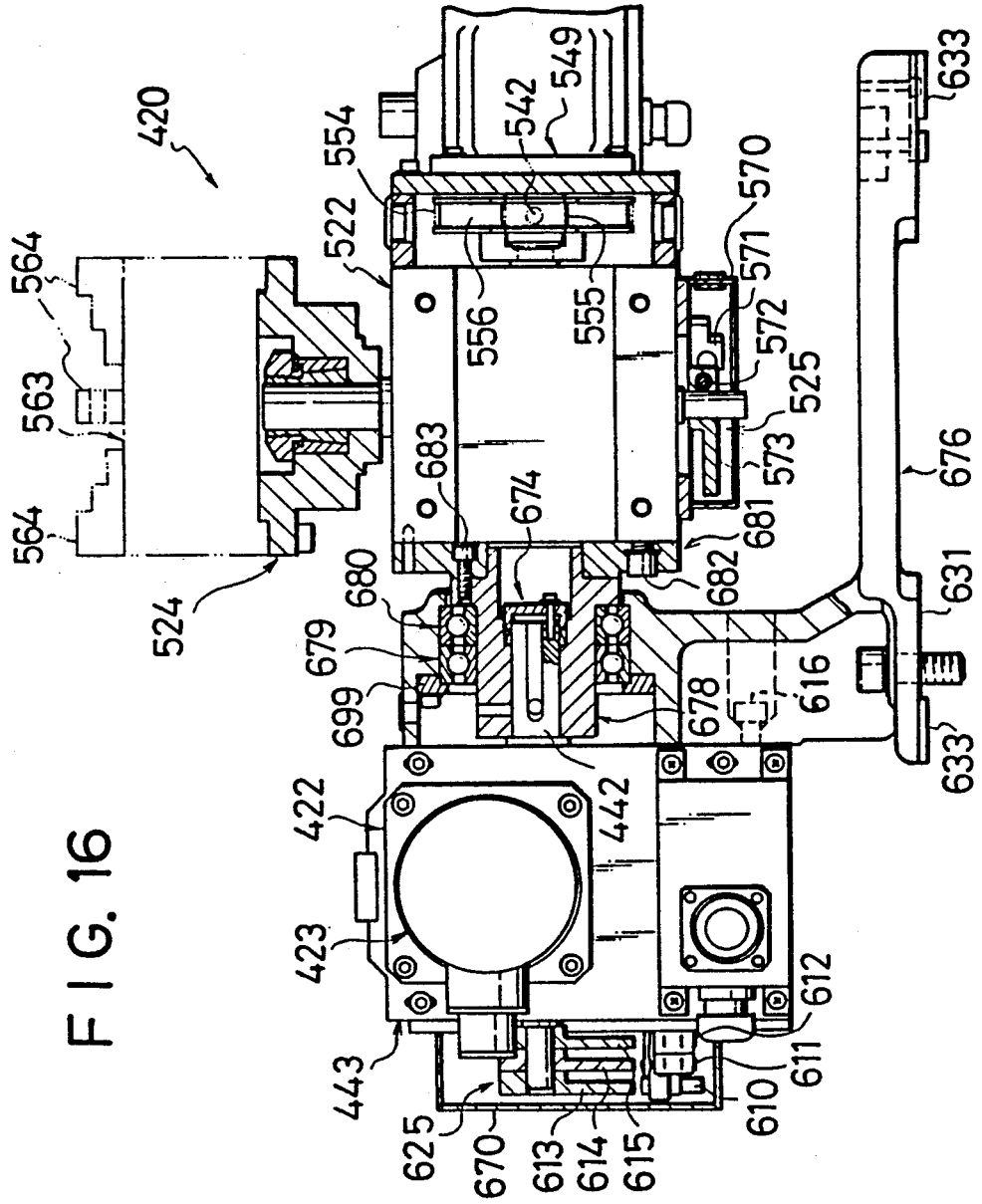
FIG. 16 is an elevational view, partly in section, showing a work rotating device in accordance with a fourth embodiment of the invention.

Referring to FIG. 16, frame 676 has a single surface 631 adapted to engage the horizontal surface of the table of a laser beam machine. The frame has an L-shaped configuration. Surface 631 is provided with two projections 633 adapted to engage with a positioning groove (not shown) formed in the table of the laser beam machine. The horizontal portion of frame 676 opposed to origin setting mechanism 525 may be provided with a through hole (not shown) similar to through holes 34, 134 and 234 in FIGS. 3, 8 and 12, to permit an operator to remove a cover 570 and to adjust origin setting mechanism 525.

Figure 19:
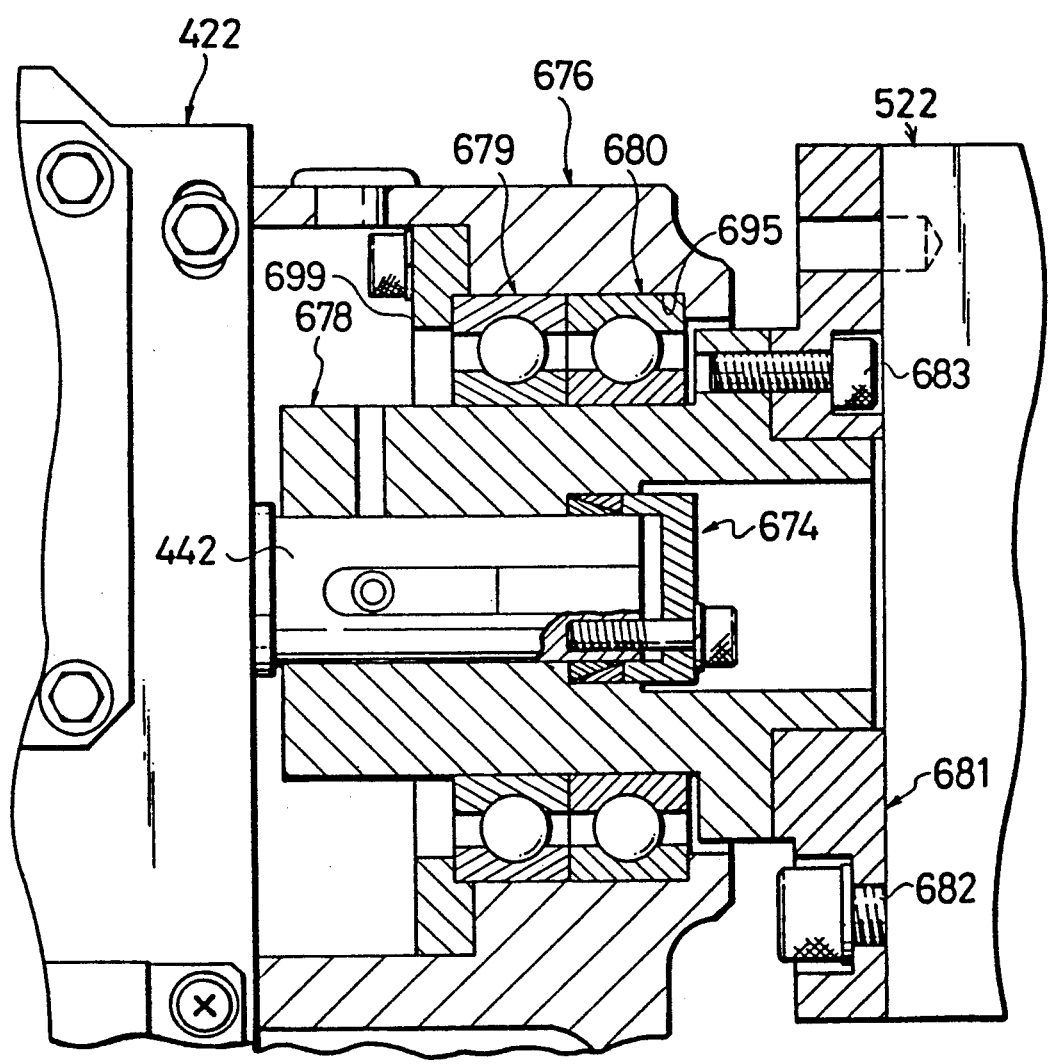
FIG. 19 is an enlarged fragmentary sectional view showing details of the connection between first and second speed reducers in the device of FIG. 16.
Figure 20:
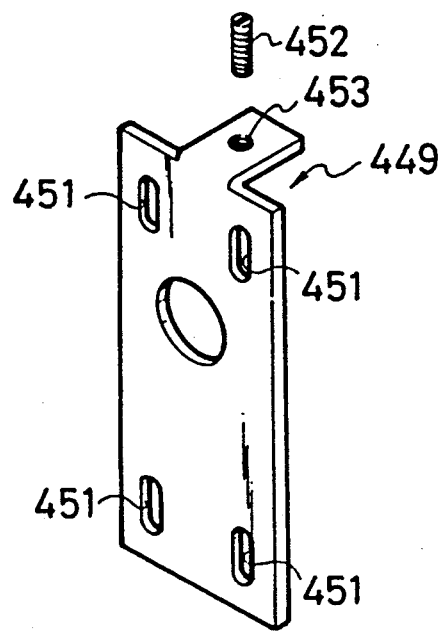
FIG. 20 is an exploded perspective view showing details of a tension adjusting plate and screw used in the device of FIG. 16.
Figure 21:
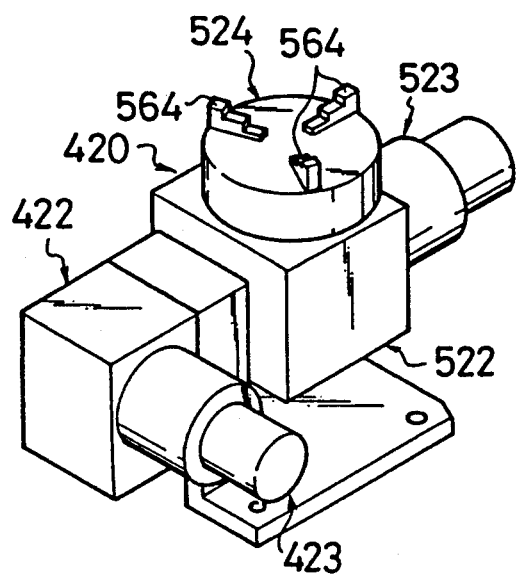
FIG. 21 is a schematic perspective view of the device of FIG. 16.

Referring to FIG. 19, an upstanding portion of frame 676 is provided with a hole 695, in which a pair of bearings 679 and 680 is provided for rotatably supporting a hollow rotating shaft 678. Bearings 679 and 680 are fixed to frame 676 by a presser plate 699 so that play of the bearings in the thrust direction is substantially eliminated.

Second speed reducer 522 is fixed by an adapter bracket 681 to the right end of a rotating shaft 678 by means of plural bolts 682 and 683 (each singly shown in FIG. 19). First speed reducer 422 is fixed by bolts 616 (see FIG. 16) to a left side surface of the upstanding portion of the frame 676. Output shaft 442 of first speed reducer 422 extends into a central hole of shaft 678, and is fixedly connected to shaft 678 by means of a frictional joint mechanism 674 utilizing wedges, as shown in FIG. 19. Output shaft 442 of the first speed reducer 422 and output shaft 542 of the second speed reducer 522 are arranged in orthogonal relationship to each other. As viewed in FIG. 17, input shaft 441 of first speed reducer 422 and an output shaft 426 of the first motor 423 are arranged in spaced, parallel relationship to each other. Input shaft 541 of second speed reducer 522 and output shaft 526 of second motor 523 are also arranged in spaced, parallel relationship to each other. The plane defined by the axes of shafts 441 and 426 is perpendicular to the plane defined by the axes of shafts 541 and 526.

First and second servo motors 423 and 523 are connected to a control circuit (not shown), and are operated under computer control in a predetermined manner in accordance with a stored program.

Output shaft 442 of speed reducer 422 extends through a housing 443 of the first speed reducer 422, and projects outwardly from right and left side surfaces of housing 443. An origin setting mechanism 625 is provided to the left of housing 443 as shown in FIG. 16. Origin setting mechanism 625 serves to set an origin for the inclination of work-supporting bed 524, and to set limits on the inclination of the bed. Origin setting mechanism 625 comprises a single proximity switch 610, two microswitches 611 and 612, and three switch operating members 613, 614 and 615 opposed to switches 610, 611 and 612, respectively. Proximity switch 610 and microswitches 611 and 612 are mounted on housing 443, while switch operating members 613, 614 and 615 are mounted on output shaft 442 of speed reducer 422. Thus, three sets, each consisting of a switch and a switch operating member are provided. One of the three sets serves to set the origin of inclination, while the other two serve to set limits on the inclination of the work-supporting bed.

When motor 523 is driven while a workpiece W (see FIG. 18) is grasped by a chuck 563, the torque of motor 523 is transmitted through output shaft 526 of motor 523, toothed pulley 555 mounted on the output shaft 526, toothed belt 554 meshing with pulley 555, toothed pulley 556 mounted on input shaft 541 of speed reducer 522 and meshing with the toothed belt 554, input shaft 541, a worm (not shown) on input shaft 541, a follower (not shown) on output shaft 542, to the output shaft 542. As a result, work-supporting bed 524 is rotated about the axis of output shaft 542. The axis is vertical when the work-supporting bed is in the condition shown in FIG. 21, and therefore, the work rotates in a horizontal plane. By virtue of the reducing function of speed reducer 522, work-supporting bed 524 is rotated at a speed lower than that of motor 523.

Figure 17:
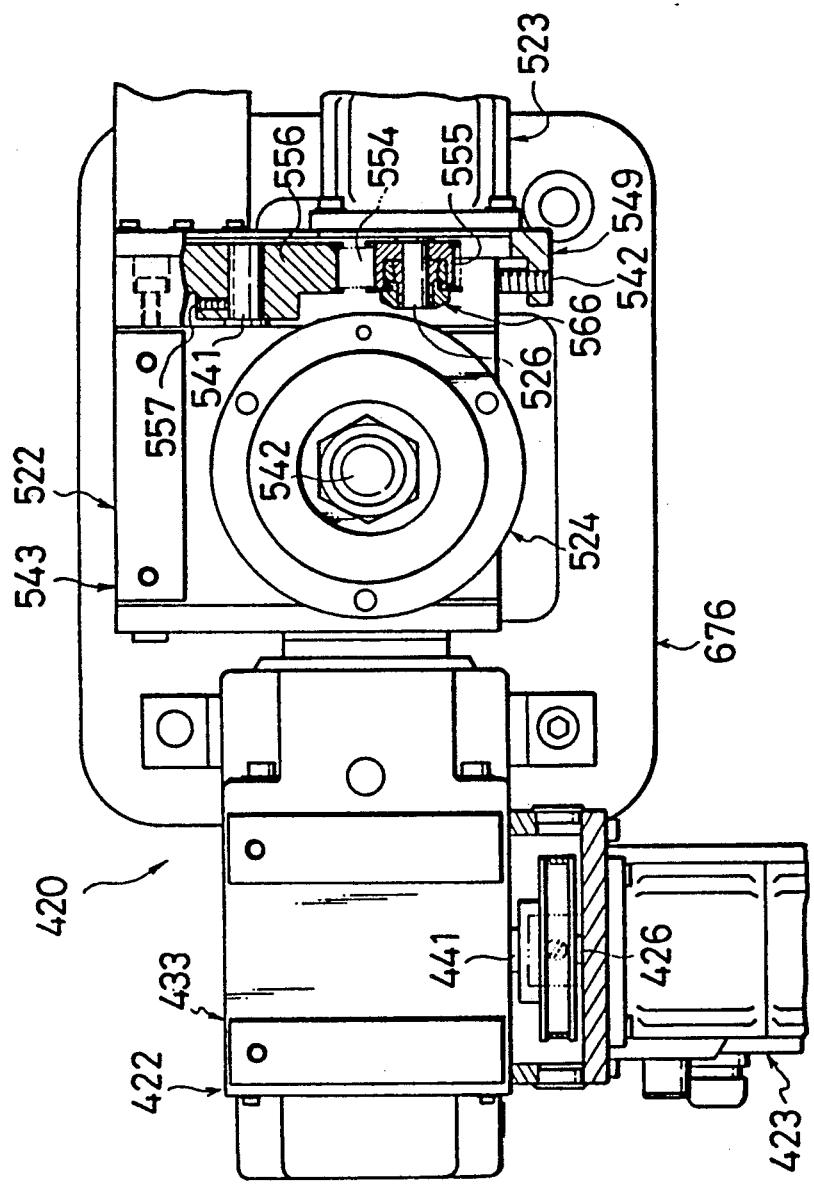
FIG. 17 is a top plan view, partly in section, of the device of FIG. 16.
Figure 18:
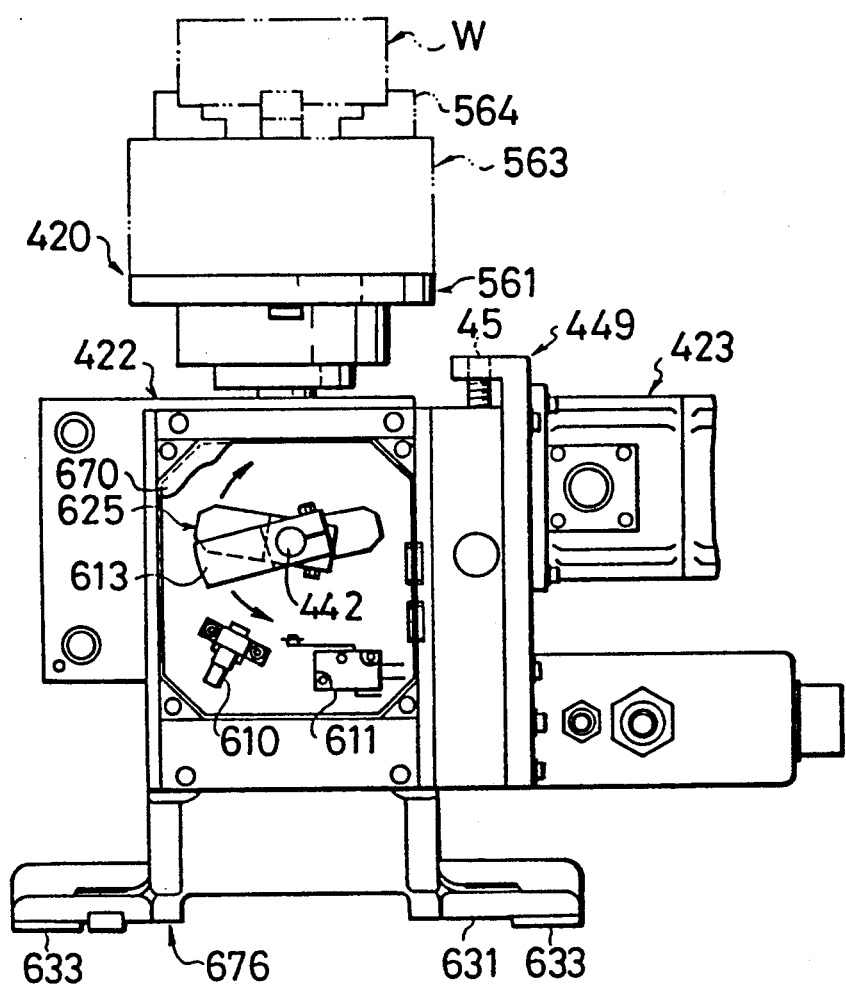
FIG. 18 is a partially cut-away left side elevational view of the device of FIG. 16.

When motor 423 is operated, its torque is transmitted through output shaft 426 of motor 423, and an assembly comprising a toothed belt and pulleys as shown in FIG. 17, to input shaft 441 of speed reducer 422. A worm (not shown) mounted on input shaft 441, is engaged, inside speed reducer 422, with a follower (not shown) on output shaft 442. As a result, shaft 678 is rotated with output shaft 442, and second speed reducer 522 and work-supporting bed 524 are tilted together by the rotation of shaft 678. By virtue of the speed reduction effected by first speed reducer 422, work-supporting bed 524 is tilted at a speed substantially lower than that of motor 423.

As previously mentioned, the first and second motors 423 and 523 are connected to a control circuit (not shown), and are operated by a computer in accordance with a stored program. Accordingly, work-supporting bed 524 can be rotated and tilted either sequentially or simultaneously in accordance with the program to carry out a predetermined complex machining operation on workpiece W.

While the origin setting mechanisms 25, 125, 225, or 525 in the first to fourth embodiments are provided on the parts of the output shafts which extend from the speed reducers in directions away from the work-supporting beds, the origin setting mechanisms can alternatively be provided on the portions of the speed reducer output shafts extending from the reducer housings to the work-supporting beds, or on the work-supporting beds themselves. This is possible since the output shafts are integrally connected with the work-supporting beds.

Although not shown, a balancing weight may be provided on the lower surfaces of the housings of speed reducers 22, 122, 222 or 522 (i.e., on the sides where the origin setting mechanism 25, 125, 225 or 525 are provided) for the purpose of counterbalancing the weights of chucks 63, 163, 263 and 563.

In the embodiment of FIGS. 8-11, the center of gravity of the assembly, consisting primarily of speed reducer 122, motor 123, work-supporting bed 124, etc. and integrally connected the manually rotatable shaft 178, is positioned substantially on the axis of shaft 178.

Similarly, in the embodiment of FIGS. 12-15, the center of gravity of the assembly, consisting primarily of second speed reducer 222, motor 223, work-supporting bed 124, etc. and integrally connected with rotating shaft 278, is positioned substantially on the axis of shaft 278.

Likewise, in the embodiment of FIGS. 16-21, the center of gravity of the assembly, consisting primarily of second speed reducer 522, second motor 523, work-supporting bed 524, etc., and integrally connected with rotating shaft 678, is positioned substantially on the axis of the shaft 678.

By positioning the centers of gravity of the tiltable assemblies substantially on the tilting axis, the work-supporting beds can be smoothly tilted. Furthermore, the torque required to effect tilting can be minimized so that manual tilting is easy in the case of the FIG. 8-15 embodiments, and motor 423 can be made compact in the case of the FIG. 16-21 embodiments.

The invention as described exhibits a number of useful advantages, among which some of the more important are the following.

In the embodiment of FIGS. 1-7, by selecting one of the two orthogonal surfaces of the frame and placing the selected surface on the table of the laser beam machine, the orientation of the work-supporting bed can be easily and accurately changed by 90°.

In the embodiments of FIGS. 8-15, the work-supporting bed can be tilted in a simple manner to any desired degree of inclination within a range.

In each of the embodiments of FIGS. 8-21, the work-supporting bed is supported in a cantilever fashion. Accordingly, the work rotating device simple in structure and can be made light in weight.

In the embodiment illustrated in FIGS. 16-21, the rotation and inclination of the work-supporting bed can be computer-controlled by independent motors, so that complex laser beam machining operations can be effected automatically.

In each embodiment, the angle of inclination can be easily fixed, and in the embodiments of FIGS. 8-21, setting mechanisms are provided which allow the angles of inclination to be set easily.

The tension of the toothed belts which connect the servo motors to the speed reducers can be easily adjusted by changing the mounting positions of the tension adjusting plates which supports the motors, relative to the speed reducers. Accordingly, the accuracy of the stopping positions of the work-supporting beds can be increased.

Machining accuracy is increased by providing origin setting mechanisms in conjunction with the speed reducers through which the work-supporting beds are driven.

By virtue of the through holes in the horizontal portions of the supporting frames, the origin setting mechanisms can be easily provided on the speed reducers at positions such that they do not interfere with other components of the work rotating devices.

Finally, by virtue of the projections provided on the frames, the work rotating devices can be easily positioned by engagement with grooves in the laser beam machine tables.

Various modifications other than those specifically discussed above can be made to the embodiments shown and described herein without departing from the scope of the invention as defined in the following claims.

We claim:

1. A work rotating device for a laser beam machine tool, comprising a frame having two orthogonally intersecting external surfaces, each of said external surfaces including means for positioning said frame on the table of a laser beam machine tool selectively with one or the other of said external surfaces in contact with the surface of the table; a speed reducer in a housing and supported on said frame, said speed reducer having an input shaft and an output shaft; motor means integrally mounted on the housing of said speed reducer for rotating said input shaft of the speed reducer; and a work-supporting bed rotatable by said output shaft of the speed reducer.

2. The work rotating device as defined in claim 1 wherein said motor means has an output shaft; in which the input shaft of the speed reducer is connected to the output shaft of said motor means by a toothed belt and toothed pulleys meshing with said toothed belt; in which said motor means is mounted on a tension-adjusting plate mounted on the speed reducer; and including means for changing the mounting position of said tension-adjusting plate with respect to the speed reducer, for adjusting belt tension.

3. The work rotating device as defined in claim 1 further comprising means providing an origin setting mechanism for setting an origin for the work-supporting bed.

4. The work rotating device as defined in claim 3, wherein said frame has a through hole opposed to said origin setting mechanism for providing access thereto.

5. The work rotating device as defined in claim 1 wherein said positioning means has a projection adapted to engage with a positioning groove formed on the table of a laser beam machine tool.

6. A work rotating device for a laser beam machine tool comprising a frame having a surface adapted to be placed on the table of a laser beam machine tool; a manually rotatable shaft rotatably supported on said frame; a speed reducer in a housing and connected to said manually rotatable shaft, said speed reducer having an input shaft and an output shaft; motor means integrally mounted on the housing of said speed reducer for rotating said input shaft of the speed reducer; and a work-supporting bed connected to said output shaft of the speed reducer; wherein the axes of rotation of said manually rotatable shaft and said output shaft of the speed reducer are arranged in intersecting relationship to each other.

7. The work rotating device as defined in claim 6 further comprising means providing a lock mechanism for locking said manually rotatable shaft to said frame.

8. The work rotating device as defined in claim 6 further comprising means for setting the angle of inclination of said work-supporting bed.

9. The work rotating device as defined in claim 6 wherein said motor means has an output shaft; in which the input shaft of the speed reducer is connected to the output shaft of said motor means by a toothed belt and toothed pulleys meshing with said toothed belt; in which said motor means is mounted on a tension-adjusting plate mounted on the speed reducer; and including means for changing the mounting position of said tension-adjusting plate with respect to the speed reducer, for adjusting belt tension.

10. The work rotating device as defined in claim 6 further comprising means providing an origin setting mechanism for setting an origin for the work-supporting bed.

11. The work rotating device as defined in claim 10, wherein said frame has a through hole opposed to said origin setting mechanism for providing access thereto.

12. The work rotating device as defined in claim 6 wherein said frame has a projection adapted to engage with a positioning groove formed on the table of a laser beam machine tool.

13. The work rotating device for a laser beam machine tool comprising a frame having a surface adapted to be placed on the table of a laser beam machine tool; a first speed reducer supported on said frame, said first speed reducer having an input shaft and an output shaft; manual operable means connected to said input shaft of the first speed reducer for rotating said input shaft; a second speed reducer in a housing and connected to said output shaft of said first speed reducer, said second speed reducer also having an input shaft and an output shaft; motor means integrally mounted on the housing of said second speed reducer for rotating said input shaft of the second speed reducer; and a work-supporting bed connected to said output shaft of the second speed reducer; wherein the axes of said output shaft of the first speed reducer and said output shaft of said second speed reducer are arranged in intersecting relationship to each other.

14. The work rotating device as defined in claim 13 further comprising means providing a lock mechanism for locking said output shaft of said first speed reducer to said frame.

15. The work rotating device as defined in claim 13 wherein said motor means has an output shaft; in which the input shaft of said second speed reducer is connected to the output shaft of said motor means by a toothed belt and toothed pulleys meshing with said toothed belt; in which said motor means is mounted on a tension-adjusting plate mounted on said second speed reducer; and including means for changing the mounting position of said tension-adjusting plate with respect to said second speed reducer, for adjusting belt tension.

16. The work rotating device as defined in claim 13 further comprising means providing an origin setting mechanism for setting an origin for the work-supporting bed.

17. The work rotating device as defined in claim 16, wherein said frame has a through hole opposed to said origin setting mechanism for providing access thereto.

18. The work rotating device as defined in claim 13 wherein said frame has a projection adapted to engage with a positioning groove formed on the table of a laser beam machine tool.

19. A work rotating device for a laser beam machine tool, comprising a frame having a surface adapted to be placed on the table of laser beam machine tool; a first speed reducer in a housing and supported on said frame, said first speed reducer having an input shaft and an output shaft; first motor means integrally mounted on the housing of said first speed reducer for rotating said input shaft of the first speed reducer; a second speed reducer connected to said output shaft of the first speed reducer, said second speed reducer also having an input shaft and an output shaft; second motor means integrally mounted to said second speed reducer for rotating said input shaft of the second speed reducer; and a work-supporting bed connected to said output shaft of the second speed reducer; wherein the axes of said output shaft of said second speed reducer are arranged in intersecting relationship to each other.

20. The work rotating device as defined in claim 19 wherein said second motor means has an output shaft; in which the input shaft of said second speed reducer is connected to the output shaft of said second motor means by a toothed belt and toothed pulleys meshing with said toothed belt; in which said second motor means is mounted on a tension-adjusting plate mounted on said second speed reducer; and including means for changing the mounting position of said tension-adjusting plate with respect to said second speed reducer, for adjusting belt tension.

21. The work rotating device as defined in claim 19 further comprising means providing an origin setting mechanism for setting an origin for the work-supporting bed.

22. The work rotating device as defined in claim 21, wherein said frame has a through hole opposed to said origin setting mechanism for providing access thereto.

23. The work rotating device as defined in claim 19 wherein said frame has a projection adapted to engage with a positioning groove formed on the table of a laser beam machine tool.

* * * * *